Sept. 23, 1952        J. M. PARAMYTHIOTI        2,611,443
                         TAMPING ROLLER Filed Sept. 8, 1948                           3 Sheets-Sheet 1

INVENTOR
JEAN M. PARAMYTHIOTI
BY
Young, Emery & Thompson
ATT'YS.

Patented Sept. 23, 1952

2,611,443

UNITED STATES PATENT OFFICE 2,611,443

TAMPING ROLLER

Jean Michel Paramythioti, Rantigny, France, assignor to Société Anonyme des Anciens Etablissements Albaret, Rantigny, France, a corporation of France Application September 8, 1948, Serial No. 48,273
In France September 24, 1947

4 Claims. (Cl. 180—20)

1

The present invention has for its object to provide improvements in tamping rollers, said improvements resulting in a substantial reduction or a complete suppression of the reaction of the engine torque on the frame upon starting.

It is known that aside from the conventional rollers having two axles including a drive axle and a steering axle, machines of a lighter type are also used wherein there is only one axle provided. Such small single-wheel tamping rollers are frequently driven from an engine secured on the frame thereof and are maintained in operative position and steered by means of a beam member. When starting operations with such a machine the engine torque meets with quite a high drag or rolling resistance due to the sinking of the roller into the ground, and as a result exerts a considerable reaction on the frame of the machine, and this reaction has to be taken up by the driver of the roller.

It is one object of the present invention to devise a roller of the one axle type, in which the above defined reaction of the engine torque against the frame and the coupling beam is substantially reduced or completely suppressed.

Another object is in a roller of any type to counter-balance through mechanical means and before the proper starting resistance of the roller.

With this end in view, I propose to replace the axial direct transmission between the engine and the roller by an epicyclic transmission, which allows for the introduction of an auxiliary torque adapted for automatically compensating the variable value of the rolling resistance torque. This compensating torque is produced by a counterweight which is moved by the epicyclic transmission to rotate about its axis to an angular position in which it exerts on said epicyclic transmission a torque approximately equal and opposite to the rolling resistance torque.

According to a main feature of my invention, the epicyclic drive transmission is an epicyclic gearing having its sun-gears and its planetary-carrier connected respectively to one of the three members comprising the drive member, the counterweight and the roller.

The invention will now be described with reference to the attached drawings where similar references are used to designate similar or equivalent elements.

2

Figure 1:
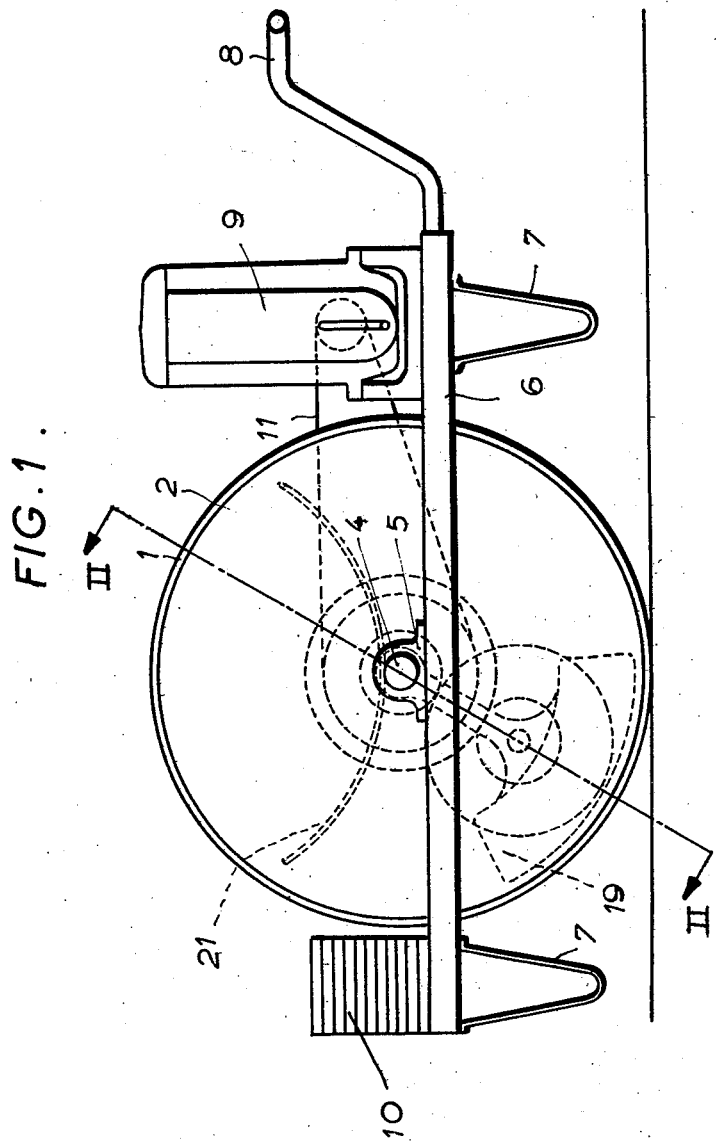
Figure 1 is a diagrammatic side view in section of a single-wheel roller provided with a counterweight drive means according to the invention.
Figure 2:
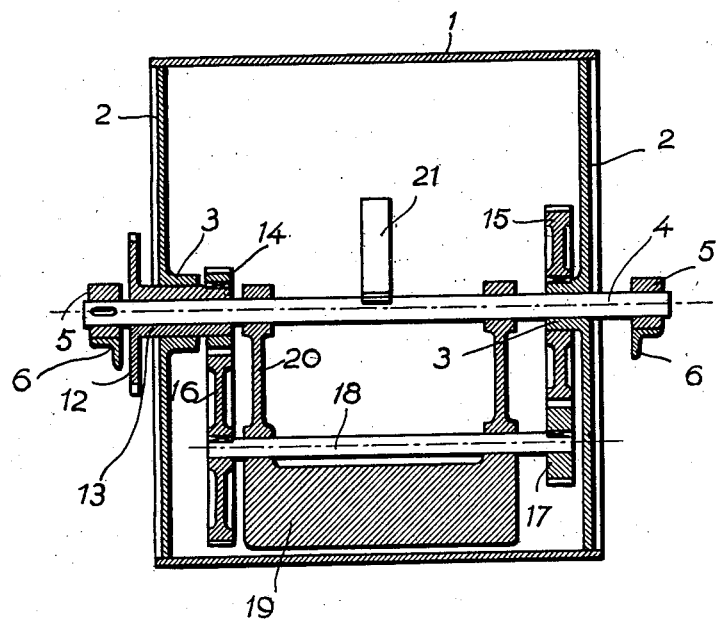
Figures 2, 3 and 4 are views of the three embodiments of the invention in cross-section on line II—II of Figure 1.

In the exemplary embodiment shown in Figs. 1 and 2, the single wheel roller comprises as shown a recessed drum structure 1 welded to side flanges 2 each formed with inward bosses 3 for centrally mounting the roller on a fixed axle-shaft 4 carried on bracket supports 5 secured to the side-sills 6 of a suitable frame. Said frame is provided with legs 7 for resting it on the ground, a steering and coupling beam member 8 and a drive motor or engine 9 balanced with a counterweight 10.

The engine 9 is connected through a sprocket chain 11 with a sprocket wheel 12 rotatably mounted outwardly of the roller between one of the supports 5 and the adjacent flange 2 on the fixed axle-shaft 4 through the medium of a hub member 13 extending through the boss 3 into the inner recess of the roller. The boss 3 of the related flange is freely rotatable on said hub member 13 and the hub member carries at its inner end a gear 14 keyed to it. The boss of the opposite flange carries a gear 15 keyed to it. Said gears mesh with a pair of gears 16 and 17 respectively keyed on a cross-shaft 18 freely rotatably extending through a counterweight 19 supported from the axle 4 through a pair of arms 20 at the upper ends of which bosses are formed that are freely mounted on the axle-shaft. The axle-shaft has secured to it an arcuate spring-plate member 21 serving as a limiting stop for the counterweight at the end of the stroke of the latter.

It is clear that the above described construction forms an epicyclic gearing, in which gears 14 and 15 are sun-gear elements in mesh with planetary gears 16 and 17 respectively of a planetary-carrier element formed by the counterweight 19 which is rotatable about a common axis with gears 14 and 15.

It will readily be understood that upon the engine 9 being started said engine will through the sprocket chain 11 drive in rotation the gear 12 and through that gear and the gears 14-16 the shaft 18 extending through the counterweight. At first, the resistance of the roller to forward motion is high and will, through the gears 15-17, oppose rotation of the shaft 18. Accordingly the counterweight will first swing upwardly around the axle-shaft, as shown in Fig. 1, in the direction of travel of the roller. The counterweight thus produces a condition of unbalance which, for a certain elevation of the counterweight will reach a value equal to the resistance to forward movement. The counterweight will then stop and the roller will start to be driven through the action of the shaft 18 which will revolve within the counterweight. Immediately upon starting, the resistance to forward movement will fall to a lower value and the counterweight return backwards to a lower position, and subsequently adapt its position to the variable value of the opposing torque. Whenever the resistance to forward motion becomes excessive, the counterweight will tend to move further up, but its upward stroke is limited by abutment against the spring member 21.

In the exemplary embodiment above described the planetary carrier is formed by the counterweight which is rotatable about the same axis as that of the roller.

The epicyclic drive is subjected to three separate torques, namely the engine torque, the torque exerted by the counterweight which varies according to the swinging angular position from its lower rest position to an active position, and the opposing torque which is the greatest at starting. The mass of the counterweight and its lever-arm are constructionally so correlated that in the fully elevated position of the counterweight the torque exerted by it will balance the starting torque, so that the counterweight will always correspond to the normal opposing torque applied to the roller when riding on the ground. Let $C_1$, $C_2$, $C_3$ be the algebraic values of the drive torque, the counterweight torque and the opposing torque respectively, then the equation of equilibrium for the epicyclic transmission in that position will be $C_1+C_2+C_3=0$. Now, in the epicyclic gearing, the said couples are applied to three separate elements, namely the two sun-gears and the planetary-carrier. Let $A_1$, $A_2$, $A_3$ be the respective algebraic values of the torques corresponding to one of the sun-gears, the planetary-carrier and the other sun-gear, then the equation of balance can also be written as $A_1+A_2+A_3=0$. Both the equations being homogeneous it is obvious that the operation of the mechanism will be independent of the correspondence between the terms in A and those in C. Otherwise stated, if $A_2$ designates the torque applied to the planetary-carrier, that torque may correspond either to the drive torque or to the counterweight's torque or yet to the opposing torque, while the torques exerted on the two sun-gears will respectively correspond to the remaining two torques.

Further forms of embodiment of the invention will now be described wherein the planetary-carrier is rigid either with the roller or alternatively with the drive member.

Figure 3:
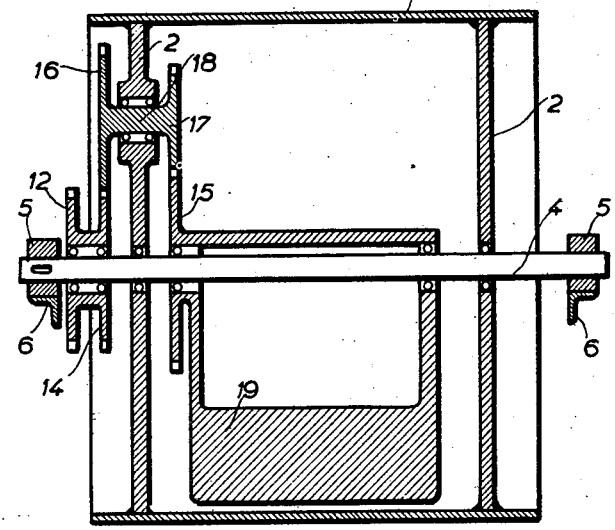

In Fig. 3 axle-shaft 4 is again secured in the supports 5 rigid with the side-sills 6 of the frame. The wheel 12 which constitutes the drive member in this embodiment is freely rotatable on the axle shaft and is rigid with a gear 14 meshing with a pinion 16 secured on a planetary shaft 18 freely rotatable in one of the flanges 2. The latter therefore plays the part of the planetary-carrier and the other planetary gear 17 is in mesh with the gear 15 which as shown is rigid with the counterweight freely rotatable on the shaft 4.

On starting, the planetary-carrier 2 is subjected to the starting torque, and the planetary shaft 18 is on the other hand subjected to a zero torque, so that rotation of the drive pinion 12 will cause rotation of the planetary shaft and the counterweight will thereupon rise until the starting torque is approximately balanced by the torque due to the counterweight when motion will take place.

Figure 4:
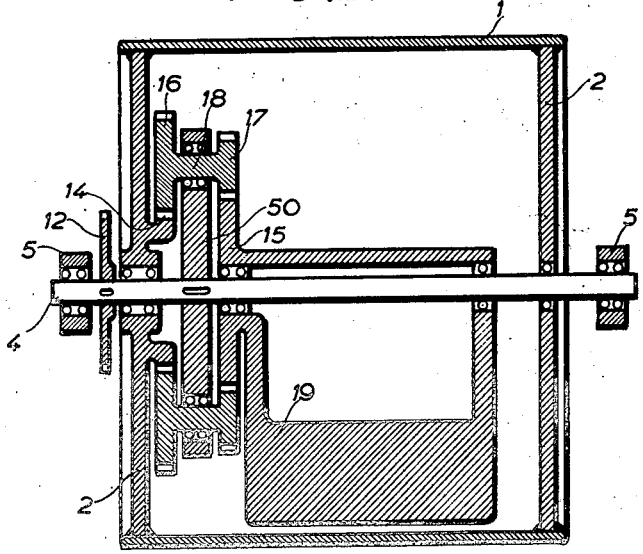

In the modification shown in Fig. 4, the shaft 4 is mounted for rotation in the bearings 5 and is rigid on the one hand with a sprocket wheel 12 and on the other hand with the planetary-carrier 50, both keyed to the said shaft. The counterweight 19 is rigid with the gear 15 and is freely rotatable on said shaft, while the pinions 17 and 16 of the planetary shaft 18 of the planetary-carrier 50 respectively mesh with the gear 15 and the gear-teeth 14 solid with the roller.

Upon starting, rotation of the gear 12 and consequently of the shaft 4 rotates the planetary-carrier 50, and, since the resistance exerted on the pinion 16 is greater than that on the pinion 17, the pinion 16 will roll on the gear-teeth 14 of the roller and rotation of the planetary-carrier will cause the counterweight to swing up. When the counterweight is brought to rest at its position of balance in which its torque balances the starting torque, it will on the other hand, be the pinion 17 that will roll along the teeth 15 which now are stationary, while the pinion 16 of the planetary-shaft in rotating will rotate the roller.

While in all of the embodiments shown the counterweight is arranged within the roller, the invention contemplates the possibility of providing a counterweight rotatably mounted outside the roller proper. Moreover the driving connection according to the invention may be executed in various manners without departing from the invention as claimed in the following claims.

What I claim is:

1. A tamping roller comprising in combination, a frame, a transverse shaft mounted in said frame, a roller mounted on said shaft and supporting said frame, a driving wheel mounted on said shaft, an epicyclic gearing having two sun-gear members and a planetary carrier member coaxial with said shaft, and a weight having its center of gravity eccentric to said shaft rigidly connected with one of said members, the other two members being respectively rigid with said roller and with said driving wheel.

2. A tamping roller according to claim 1 in which the planetary carrier is rigid with the counterweight.

3. A tamping roller according to claim 1 in which the planetary carrier is rigid with the roller.

4. A tamping roller according to claim 1, in which the planetary carrier is rigid with the driving wheel.

JEAN MICHEL PARAMYTHIOTI.

REFERENCES CITED

The following references are of record in the file of this patent:

UNITED STATES PATENTS

| Number | Name | Date |
| --- | --- | --- |
| 434,131 | Harris | Aug. 12, 1890 |
| 917,590 | Grafft | Apr. 6, 1909 |
| 1,557,956 | Zubaty | Oct. 20, 1925 |